United States Patent [19]

Stil et al.

[11] Patent Number: 4,671,806

[45] Date of Patent: Jun. 9, 1987

[54] PROCESS AND APPARATUS FOR COOLING AND PURIFYING A HOT GAS CONTAINING SLAG PARTICLES

[75] Inventors: Jacob H. Stil; Louis H. Turner, III, both of Houston, Tex.

[73] Assignee: Shell Oil Company, Houston, Tex.

[21] Appl. No.: 816,694

[22] Filed: Jan. 6, 1986

Related U.S. Application Data

[63] Continuation of Ser. No. 600,852, Apr. 16, 1984, abandoned.

[30] Foreign Application Priority Data

May 4, 1983 [GB] United Kingdom ............... 8312103

[51] Int. Cl.[4] .............................................. B01D 45/12
[52] U.S. Cl. .......................................... 55/80; 55/269; 55/459 R; 55/431; 48/77; 48/210; 48/DIG. 2
[58] Field of Search ............... 48/197 R, 77, 128, 210, 48/DIG. 2, 87; 55/269, 432, 99, 80, 459 R, 431

[56] References Cited

U.S. PATENT DOCUMENTS 4,309,196  1/1982  Vollhardt ............................. 55/269
4,455,154  6/1984  Blasiole .

FOREIGN PATENT DOCUMENTS 34111    9/1978  Japan .
618632   2/1949  United Kingdom ............... 55/267
2106931  4/1983  United Kingdom .
2112015  7/1983  United Kingdom .

Primary Examiner—Bernard Nozick

[57] ABSTRACT

A process for cooling and purifying a hot gas containing slag particles comprises the following steps:
(a) the velocity of the gas mixture is reduced;
(b) the flow of the gas mixture having a reduced velocity is deflected, the gas mixture being passed upward in substantially vertical direction so that part of the slag particles falls down into a fluidized bed of slag particles;
(c) cold clean recycle gas is introduced through a fluidization distributor into the fluidized bed, thereby cooling the slag particles and keeping at least part of the slag particles in the fluidized bed;
(d) the gas mixture flowing substantially vertically upward at reduced velocity is cooled by indirect exchange of heat, while a further quantity of slag particles falls down into the fluidized bed; and
(e) the cooled slag particles are discharged from the bottom of the fluidized bed through a discharge pipe.

An apparatus to carry out this procedure is also described.

16 Claims, 1 Drawing Figure

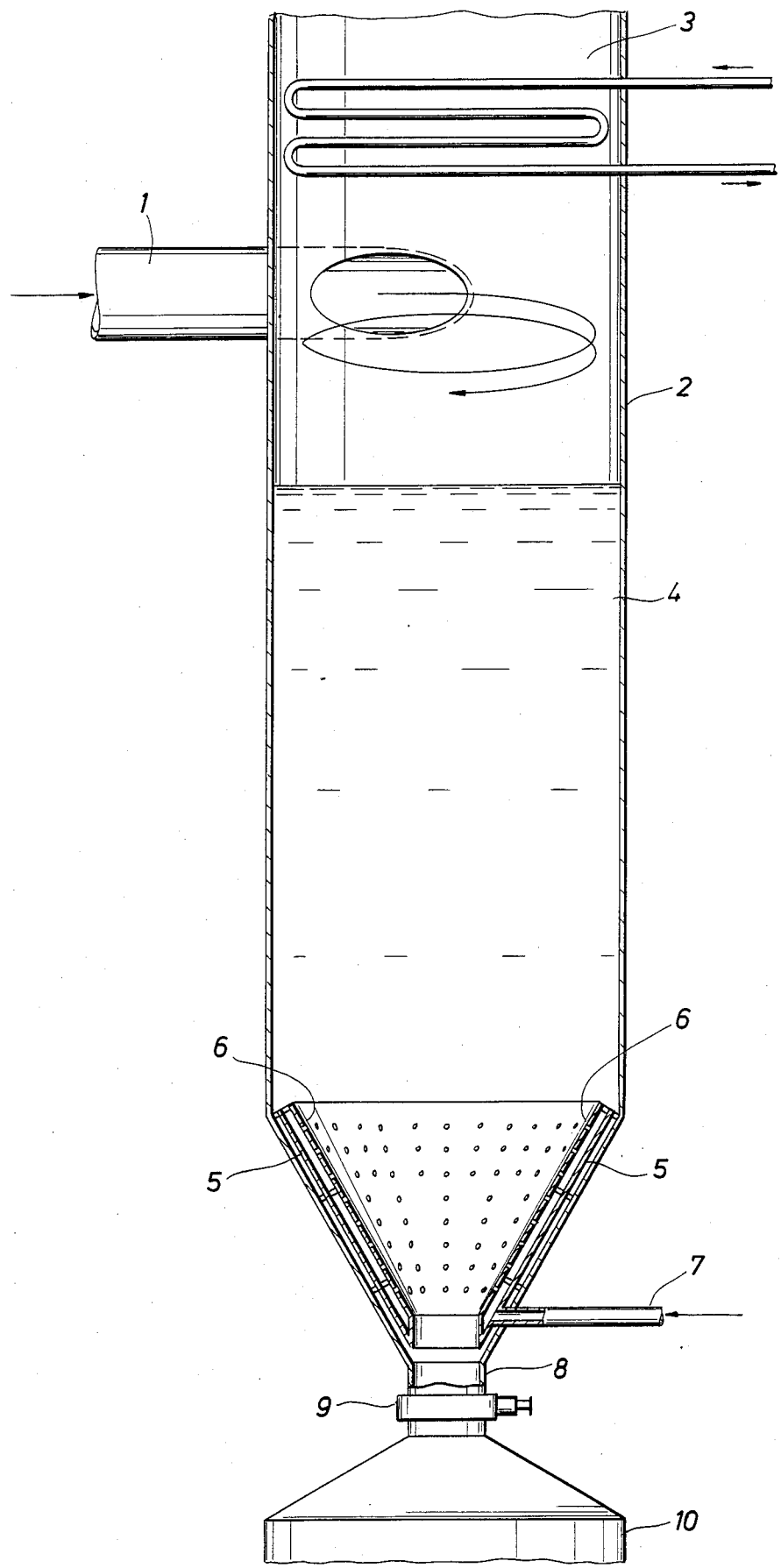

PROCESS AND APPARATUS FOR COOLING AND PURIFYING A HOT GAS CONTAINING SLAG PARTICLES

This is a continuation of application Ser. No. 600,852, filed Apr. 16, 1984, now abandoned.

BACKGROUND OF THE INVENTION

The invention relates to a process and an apparatus for cooling and purifying a hot gas containing slag particles.

Hot gas containing a sticky liquid and/or solid slag in finely-divided form is obtained when carbon-containing material, such as coal, brown coal, lignite, peat, petroleum coke, heavy residual petroleum fractions, and oil recovered from tar sand or bituminous shale, is completely or partly combusted. The gas is generated in an oven or reactor, and on leaving the oven or reactor generally has a temperature in the range of from 1300° C. to 2000° C. A suitable reactor for this purpose is described in the British patent specification No. 1,150,284.

The hot gas leaves the reactor at the top end, and then flows upwards through a substantially vertical pipe. A gas generated by partial oxidation consists for the greater part of $H_2$ and CO, and possibly additionally of $CO_2$, $CH_4$, $H_2O$, $N_2$, $H_2S$ and Ar, and entrains sticky slag droplets and/or particles (dependent on the gas temperature and the nature of the inorganic components of the carbon-containing material to be combusted) from the reactor. In order to cool the hot gas rapidly to such a temperature that the sticky particles occurring therein lose their stickiness and the droplets solidify to non-sticky particles, a quantity of cold, clean gas is advantageously injected into the hot gas.

In conventional coal gasification plants, it has been usual to place a heat exchanger for cooling the generated gas above the gasification reactor. For relatively low capacities, this arrangement is practical, but for an apparatus in which a high rate of production of $H_2$- and CO-containing gas is possible, problems arise due to the great structural height involved. In an apparatus of this type, the reactor and the heat exchanger will, therefore, preferably be located next to each other.

A suitable apparatus and process are described in British patent application No. 8,209,664 now British Pat. No. 2,112,015. As described therein, the hot gas from the reactor flows upwards, is reversed to flow downwards, and is passed to the lower part of the heat exchanger. The slag particles are not yet separated from the hot gas mixture, but are further entrained by the gas mixture. The gas mixture is fed into a flow-deflection chamber located at the bottom of the heat exchanger. In the flow-deflection chamber, the velocity of the gas mixture is reduced. Due to the reduction of the velocity of the gas mixture and to the deflection, part of the slag particles settles and drops down to the bottom of the heat exchanger. Slag particles dropping down in the flow-deflection chamber must continuously or periodically be removed from the bottom. The slag particles, however, are still hot, which makes handling them troublesome. Moreover, valves and conduits used in the removal of the hot slag particles out of the bottom of the flow-deflection chamber are subjected to heavy erosion. The present invention provides a method for cooling and purifying a hot gas containing slag particles in which handling of the particles to be removed is relatively easy, and erosion of valves and conduits in the removal of slag particles is reduced to a great extent.

SUMMARY OF THE INVENTION

Accordingly, the present invention relates to a process for cooling and purifying a hot gas mixture containing slag particles, comprising:

(a) reducing the velocity of the gas mixture;

(b) deflecting the flow of the gas mixture having a reduced velocity in a deflection zone, and passing the gas mixture upward in substantially vertical direction so that part of the slag particles falls into a fluidized bed of slag particles;

(c) introducing cold clean recycle gas into the fluidized bed, thereby cooling the slag particles and keeping at least part of the slag particles in the fluidized bed;

(d) cooling the gas mixture flowing substantially vertically upward at reduced velocity by indirect exchange of heat, while a further quantity of slag particles falls down into the fluidized bed; and (e) discharging cooled slag particles from the bottom of the fluidized bed.

The invention also relates to an apparatus for carrying out the process described hereinbefore, which apparatus is characterized in that it comprises the following components:

(a) a substantially vertically arranged heat exchanger comprising a flow-deflection chamber at its bottom end, (b) a first supply pipe, for hot gas containing slag particles, the lower end of said first pipe communicating with the flow deflection chamber through the side wall of the flow-deflection chamber, (c) a second supply pipe, for cold clean recycle gas, the second pipe communicating with a fluidization distributor in the lower portion of the flow-deflection chamber and therethrough with the flow deflection chamber, and (d) means for discharge of slag particles, which discharge means communicate with the lower portion of the flow-deflection chamber of the heat exchanger below the second supply pipe entry.

DETAILED DESCRIPTION OF THE INVENTION

Generally, the mixture entraining slag particles flows downward. The invention, however, is not restricted to downward flowing gas mixtures. Preferably, the center line of the supply pipe for the hot gas mixture is at an angle ranging from 20° to 90° to the vertical. If this angle is chosen larger than 90°, the flow in the flow-deflection chamber is deflected too little for an appropriate settlement of the slag particles entrained by the gas. If the angle chosen is smaller than 20°, the various parts of the present apparatus (i.e. reactor, supply pipe, heat exchanger) will be too compactly arranged, so that practical design and operation become very troublesome.

It may be noted that the angle of 90° is applied to the bottom end of the supply pipe due to constructional advantages. The major part of the supply pipe may be arranged obliquely, e.g., at an angle between the center line of the major part of the supply pipe and the vertical, preferably ranging from 20° to 45°.

The settlement of slag particles from the hot gas mixture is caused by reducing the gas velocity and deflecting the flow. The hot gas, which generally has a temperature ranging from 300° to 1500° C., at a preferred pressure of 2 to 60 bar, preferably flows downwards at an average linear velocity ranging from 4 to 20 m/s. In order to promote settlement of slag, the velocity of the gas mixture flowing from the supply pipe into the flow-deflection chamber is first reduced therein. In order to ensure this, the internal diameter of the flow-deflection chamber of the heat exchanger is preferably 2-4 times as large as the internal diameter of the supply pipe.

Not only the reduction of the gas velocity promotes the settlement of slag. The deflection of the flow has a promoting effect as well. This effect grows as the deflection increases. When the flow of the gas mixture is deflected, the solid particles are hurled out of the gas stream due to their greater inertia. They subsequently drop down into the fluidized bed.

The hurling effect may be augmented if the flow is tangentially passed into the flow-deflection chamber. Centrifugal forces induce an increased tendency of the slag to leave the gas stream and settle. Accordingly, the bottom of the supply pipe for the hot gas preferably issues tangentially into the flow-deflection chamber. This is especially advantageous when the deflection of the flow is relatively little, e.g. when the center line of the bottom end of the supply pipe is at an angle of 90° to the vertical.

Due to the velocity reduction and the deflection, the slag content in the hot gas, which generally has a slag particle content ranging from 1 to 20% by weight, is reduced. Preferably, the gas mixture flowing substantially vertically upwards at reduced velocity has a slag particle content ranging from 0.1 to 19% by weight. It should be borne in mind that the gas mixture flowing upwards comprises not only gas from the supply pipe but also gas that comes from the fluidized bed at the bottom of the flow-deflection chamber.

In the fluidized bed, the hot slag particles are cooled and kept at least partly in a fluidized state. That is why cold clean recycle gas is introduced into the fluidized bed. The gas may have a considerably high temperature. Still it is designated "cold" in relation to the temperature of the hot gas. It is cold because of the cooling effect it must have. It is recycle gas since in this way contamination of the hot gas with a different fluidization gas is avoided. Per kg of slag particles, a quantity of cold, clean recycle gas, preferably ranging from 0.5 to 10 kg, is injected into the fluidized bed. The cold clean gas advantageously has a temperature ranging from 70° to 200° C.

The circumstances in the fluidized bed are chosen so that slag particles are sufficiently cooled and so that the velocity of the cold clean recycle gas is high enough to induce fluidization on one hand, but low enough, on the other hand, to make sure that the velocity of the gas mixture in the flow-deflection chamber is lower than the velocity of the hot gas in the supply pipe. As long as these conditions are fulfilled, the other circumstances are not critical. Accordingly, the mean residence time of the slag particles in the fluidized bed, and the height of the bed, may be varied within wide ranges.

The particles are preferably cooled to such an extent that the average temperature of the cooled slag particles obtained by the injection of cold, clean gas into the fluidized bed ranges from 200° to 600° C. At a temperature as low as 200° C., the particles can easily be handled. Moreover, further cooling would require more and colder fluidization gas, so that the resulting gas mixture, i.e. the hot gas from the supply pipe and the gas from the fluidized bed, would be cooler, too, on its route through the heat exchanger. Further cooling would thus reduce the heat recovery in the heat exchanger which would be detrimental to the thermal efficiency of the whole process. At temperatures above 600° C., any valve or conduit involved in the transport of the hot slag particles would be heavily eroded. Furthermore, handling of particles at these temperatures is very troublesome.

As already has been stated, the gas mixture in the flow-deflection chamber has a lower velocity than the hot gas in the supply pipe. In order to induce sufficient settlement of slag from the hot gas, the average linear veocity of the upflowing gas mixture preferably has a value ranging from 1 to 19 m/s.

The location where the supply pipe issues into the flow-deflection chamber is important for the height of the fluidized bed. However, as the height of the fluidized bed may vary within wide ranges the location is not critical. The supply pipe is preferably connected to the side-wall of the flow-deflection chamber of the heat exchanger at a point located at a distance from the bottom of the flow-deflection chamber that is equal to 2-10, preferably 4-8, times the internal diameter of the supply pipe.

The cold, clean recycle gas is introduced into the fluidized bed by means of a fluidization distributor at the bottom of the flow-deflection chamber. Any conventional fluidization distributor may be used, e.g. a porous plate of sintered metal or a number of gas tubes provided with small holes. Preferably, the fluidization distributor has the form of a reversed double truncated cone, the outer cone being connected to the supply pipe for cold, clean recycle gas and the inner cone containing openings for distributing the cold clean recycle gas into the bottom of the flow-deflection chamber. Due to the oblique wall of the inner cone, the slag particles can easily slide from the fluidized bed towads the outlet at the bottom of the flow-deflection chamber.

The substantially vertically arranged heat exchanger is preferably of the type which contains cooling tubes through which coolant flows and around which the gas mixture to be cooled is passed. The gas mixture is cooled on its route through the heat exchanger, for example, to a temperature ranging from 150° C. to 400° C., while the slag content is reduced to a value ranging from 0.09 to 18.9% by weight, since a further quantity of slag particles also settles in the heat exchanger.

The slag particles dropping down in the flow-deflection chamber and in the remaining part of the heat exchanger drop into the fluidized bed at the bottom of the flow-deflection chamber. They must continuously or periodically be removed from the bottom. To this end, a discharge pipe for slag particles is connected to the bottom of the flow-deflection chamber, which discharge pipe preferably issues into an apparatus for depressurizing and removing slag particles.

This apparatus may consist of an ordinary vessel if the gasification of the carbon-containing material and the subsequent cooling and purification of the gas thus generated take place at substantially atmospheric pressure. However, gasification, cooling and purification preferably take place at elevated pressure, for example, 2-60 bar. Therefore, the apparatus for removing slag particles will generally consist of a lock system. Per ton of hot gas that is introduced into the cooling and purifying apparatus, a quantity of 10-200 kg of slag particles is advantageously discharged from the flow-deflection chamber.

Despite all measures described hereinbefore, it is still possible that a few particles will adhere to the inner walls of the supply pipe, flow-deflection chamber and heat exchanger, as a result of which the cooling effect of said surfaces is reduced and the passage through the whole system is reduced. These effects are undesirable. Therefore, means are preferably connected to the supply pipe, flow-deflection chamber and/or heat exchanger to remove slag deposits from the inner walls of said components. These means may be of various types, e.g., acoustic, mechanical and/or electrical means, or high-pressure gas jets. However, mechanical jogging means are preferred. For optimum operation of the latter means, the supply pipe and/or the flow-deflection chamber of the heat exchanger are preferably designed in such a manner that there is some clearance between the above-mentioned membrane wall, on the inside of which slag particles can settle, and an insulating layer suitably arranged against the inside of the (steel) outer wall of said components of the apparatus according to the invention. The outer wall is preferably kept relatively cool, since it must be capable of absorbing forces resulting from the high pressure, for example 2–60 bar, at which the process of the invention is preferably carried out.

The invention will now be further illustrated with reference to the FIGURE, which shows a diagrammatic representation of the apparatus in which the process according to the invention is carried out, in which drawing auxiliary equipment, such as pumps, compressors, valves, cleaning devices and control instruments are not included. All values are merely calculated or exemplary.

However, the invention is by no means limited to the description based on this FIGURE.

Through a supply pipe (1), a gas mixture containing slag particles enters a flow-deflection chamber (2) of a heat exchanger (3). Only the lower part of heat exchanger (3) is shown. The gas mixture may be indirectly cooled in the supply pipe (1) by means of membrane walls through which a coolant can flow (not shown). A part of the slag particles is separated from the gas mixture and drops down in a fluidized bed (4), located at the bottom of the flow-deflection chamber (2). Cold clean fluidization gas is fed to the fluidization bed through a conduit (7), and a fluidization distributor (5, 6). The fluidization distributor consists of a reversed truncated double cone, the outer cone (5) being connected to the conduit (7) and the inner cone (6) distributing the fluidization gas into the fluidized bed. Slag particles which are cooled are removed from the flow-deflection chamber (2) via an outlet (8) and a valve (9) to a vessel (10) in which they are depressurized and from which they are removed.

The fluidization gas and the gas from the supply pipe (1) flow upwards around cooling tubes (not shown) in the heat exchanger (3). A part of the slag particles still present in the rising gas mixture settles in the heat exchanger and subsequently drops into the fluidized bed. The cooled and partially purified gas leaves the apparatus through an outlet at the top of the heat exchanger (3) (not shown). After further cooling and purification, part of it is recycled to the fluidized bed via the conduit (7).

In a process as diagrammatically shown in the FIGURE, a stream comprising 167,000 kg/hr of a hot gas and 11,756.8 kg/hr of slag, which stream has a temperature of 700° C., is passed via the supply pipe (1) into the flow-deflection chamber (2). The hot gas has the following composition:

|  | Vol. % |
| --- | --- |
| $H_2$ | 27.35 |
| CO | 61.59 |
| $CO_2$ | 1.96 |
| $CH_4$ | 0.01 |
| $N_2$ | 5.53 |
| Ar | 0.96 |
| $H_2O$ | 1.68 |
| $H_2S$ | 0.92 |

The hot gas has a velocity of 6.61 m/s.

Into the fluidized bed (4) at the bottom of the flow-deflection chamber (2), 4167 kg/hr fluidization gas is introduced through the conduit (7), the fluidized bed comprising 4125 kg of slag. The fluidization gas has substantially the same composition as the hot gas to be cooled, and has a temperature of 80° C. The gas mixture flowing upward to the heat exchanger cooling tubes has a temperature of 690° C., and an average velocity of 1.99 m/s.

On is route through the heat exchanger the gas mixture is cooled to 360° C., its slag content decreasing. Through the outlet at the top of the heat exchanger 171,167 kg/hr cooled gas is discharged. At the the bottom, finely divided slag, with an average temperature of 282° C., is discharged via valve (9) to the vessel (10).

What is claimed is:

1. A process for cooling and purifying a hot gas containing slag particles comprising
   (a) reducing the velocity of the gas mixture;
   (b) deflecting the flow of the gas mixture having a reduced velocity in a deflection zone, and passing the deflected gas mixture upward in substantially vertical direction in such manner that part of the slag particles falls into a fluidized bed of slag particles;
   (c) introducing cold clean recycle gas into the fluidized bed, thereby cooling the slag particles and keeping at least part of the slag particles in the fluidized bed, and forming a gas mixture flowing substantially vertically upward which comprises said gas mixture and gas from said fluidized bed;
   (d) cooling the gas mixture flowing substantially vertically upward at reduced velocity by indirect exchange of heat, while a further quantity of slag particles falls down into the fluidized bed; and
   (e) discharging cooled slag particles from the bottom of the fluidized bed.

2. The process of claim 1 in which the hot gas has a temperature of from 300° C. to 1500° C., and a pressure of from 2 to 60 bar.

3. The process of claim 2 in which the hot gas flows downward in step (a) at an average linear velocity of from 4 to 20 m/s.

4. The process of claim 3 in which the hot gas has a slag particle content ranging from 1 to 20% by weight.

5. The process of claim 4 in which the quantity of cold, clean recycle gas employed is from 0.5 to 10 kg per kg of slag particles.

6. The process of claim 5 in which the cold, clean recycle gas has a temperature of from 70° C. to 200° C.

7. The process of claim 6 in which the average temperature of the cooled slag particles obtained by the injection of cold, clean gas into the fluidized bed is from 200° C. to 600° C.

8. The process of claim 7 in which the hot gas is introduced tangentially in the deflection zone, and the average linear velocity of the upflowing deflected gas mixture in step (b) has a value ranging from 1 to 19 m/s.

9. The process of claim 8 in which the gas mixture flowing substantially vertically upward has a slag particle content ranging from 0.1 percent to 18 percent by weight.

10. The process of claim 9 in which the gas mixture flowing substantially vertically upward is cooled by indirect heat exchange to a temperature ranging from 150° C. to 400° C.

11. An apparatus for cooling and purifying a hot gas containing slag particles comprising
 (a) a substantially vertically-arranged heat exchanger having a gas outlet at the top thereof and a flow-deflection chamber at its bottom end;
 (b) a first supply pipe, for hot gas containing slag particles, the lower end of said first pipe communicating with the flow deflection chamber through the side wall of the flow-deflection chamber;
 (c) a second supply pipe, for cold clean recycle gas, the second pipe communicating with a fluidization distributor in the lower portion of the flow-deflection chamber and therethrough with the flow deflection chamber; and
 (d) means for discharge of slag particles, which means for discharge communicates with the lower portion of the flow-deflection chamber of the heat exchanger below the second supply pipe entry.

12. The apparatus of claim 11 in which the center line of the first supply pipe for hot gas is at an angle ranging from 20° to 90° to the vertical.

13. The apparatus of claim 11 in which the bottom end of the supply pipe for the hot gas communicates in such manner that hot gas issues tangentially into the flow-deflection chamber.

14. The apparatus of claim 11 in which the internal diameter of the flow-deflection chamber is 2 to 4 times as large as the internal diameter of the first supply pipe.

15. The apparatus of claim 11 in which the first supply pipe is connected to the side wall of the flow-deflection chamber of the heat exchanger at a point located at a distance from the bottom of the flow-deflection chamber equalling 2 to 10 times the internal diameter of the supply pipe.

16. The apparatus of claim 11 in which the fluidization distributor at the bottom of the flow-deflection chamber has the form of a reversed double truncated cone, the outer cone communicating with the supply pipe for cold clean recycle gas, and the inner cone having openings for distributing the cold clean recycle gas into the bottom of the flow-deflection chamber.

* * * * *